United States Patent
Holeman et al.

(10) Patent No.: US 10,623,424 B2
(45) Date of Patent: Apr. 14, 2020

(54) SUPPLEMENTING NETWORK FLOW ANALYSIS WITH ENDPOINT INFORMATION

(71) Applicant: Ziften Technologies, Inc., Austin, TX (US)

(72) Inventors: Ryan Holeman, Austin, TX (US); Al Hartmann, Round Rock, TX (US); Josh Harriman, Austin, TX (US); Josh Applebaum, Austin, TX (US)

(73) Assignee: Ziften Technologies, Inc., Austin, TX (US)

( * ) Notice: Subject to any disclaimer, the term of this patent is extended or adjusted under 35 U.S.C. 154(b) by 286 days.

(21) Appl. No.: 15/352,056

(22) Filed: Nov. 15, 2016

(65) Prior Publication Data

US 2017/0237760 A1  Aug. 17, 2017

Related U.S. Application Data

(60) Provisional application No. 62/296,326, filed on Feb. 17, 2016.

(51) Int. Cl.
*H04L 29/06* (2006.01)
*G06F 9/455* (2018.01)
(Continued)

(52) U.S. Cl.
CPC ...... *H04L 63/1425* (2013.01); *G06F 9/45558* (2013.01); *H04L 41/046* (2013.01);
(Continued)

(58) Field of Classification Search
CPC ... H04L 43/0876; H04L 41/046; H04L 67/10; H04L 43/02; H04L 63/1425;
(Continued)

(56) References Cited

U.S. PATENT DOCUMENTS

| 7,665,136 B1 | 2/2010 | Szor |
| 8,782,800 B2 | 7/2014 | Brennan et al. |

(Continued)

OTHER PUBLICATIONS

Application Monitoring Using NetFlow—Technology Design Guide, Cisco, Aug. 2013, 60 pages.

(Continued)

*Primary Examiner* — Farid Homayounmehr
*Assistant Examiner* — Sanchit K Sarker
(74) *Attorney, Agent, or Firm* — Kowert, Hood, Munyon, Rankin & Goetzel, P.C.

(57) ABSTRACT

Techniques are disclosed for supplementing network flow analysis with data collected from endpoint computer systems in a network. An endpoint analysis agent may run on endpoints to collect information relating to computing activity internal to the endpoint, including system configuration information, event information, and network, user, process, and file activity. This information may be reported to a network flow analyzer using an extensible flow data record format. The flow analyzer may then correlate this information with network flow data records received from flow collectors in the network to perform a security analysis. In various embodiments, the endpoint analysis agent may cache the collected information when the endpoint is offline. The agent may also perform data reduction operations (such as compression) on the collected information before reporting; data may be further reduced by reporting data only during specified time periods. An analysis agent may also be deployed in a cloud environment.

16 Claims, 10 Drawing Sheets

(51) Int. Cl.
*H04L 12/24* (2006.01)
*H04L 29/08* (2006.01)
*H04L 12/26* (2006.01)

(52) U.S. Cl.
CPC ............ *H04L 43/02* (2013.01); *H04L 43/026* (2013.01); *H04L 67/10* (2013.01); *H04L 67/12* (2013.01); *H04L 67/2842* (2013.01); *H04L 67/40* (2013.01); *G06F 2009/45591* (2013.01); *G06F 2009/45595* (2013.01); *H04L 41/5096* (2013.01); *H04L 63/1441* (2013.01)

(58) Field of Classification Search
CPC ..... H04L 67/2842; H04L 67/12; H04L 67/40; H04L 43/026; H04L 41/5096; H04L 63/1441; G06F 9/45558; G06F 2009/45591; G06F 2009/45595
USPC .......................................................... 726/22
See application file for complete search history.

(56) References Cited

U.S. PATENT DOCUMENTS

| | | | |
|---|---|---|---|
| 8,842,578 | B1 | 9/2014 | Zisapel et al. |
| 9,591,018 | B1 * | 3/2017 | Zakian .................. G06F 21/552 |
| 2007/0121626 | A1 | 5/2007 | Shepard |
| 2012/0005542 | A1 | 1/2012 | Petersen et al. |
| 2013/0159864 | A1 * | 6/2013 | Smith ..................... H04L 41/12 715/734 |
| 2014/0165207 | A1 | 6/2014 | Engel et al. |
| 2014/0181290 | A1 | 6/2014 | Wong |
| 2014/0189861 | A1 | 7/2014 | Gupta et al. |
| 2014/0279768 | A1 | 9/2014 | Rash et al. |
| 2015/0007316 | A1 * | 1/2015 | Ben-Shalom ....... H04L 63/1416 726/23 |
| 2016/0112270 | A1 | 4/2016 | Danait et al. |
| 2016/0212172 | A1 * | 7/2016 | Senanayake ............ H04L 63/20 |
| 2016/0359872 | A1 | 12/2016 | Yadav et al. |
| 2016/0359915 | A1 * | 12/2016 | Gupta ..................... H04L 43/04 |

OTHER PUBLICATIONS

Jamie Lee, "Username NetFlow Reporting," Plixer, May 25, 2013, https://www.plixer.com/blog/network-security/username-netflow-reporting/, 4 pages. [Retrieved Nov. 5, 2014].

Ziften Technologies, Inc., Press Release, "Ziften Launches Ziften ZFlow™ Combining Network Visibility with Endpoint Context to Enhance Security," Apr. 21, 2015;https://ziften.com/ziften-launches-ziften-zflow-combining-network-visibility-with-endpoint-context-to-enhance-security/, 4 pages. [Retrieved Apr. 25, 2019].

Ziften/Lancope webinar video on YouTube: Extending Network Visibility: Down to the Endpoint (Webinar), Jun. 19, 2015; https://www.youtube.com/watch?time_continue=3&v=v2SxWBIHxNc, entire video.

James Lawrence, "Ziften ZFlow Reporting Support," plixer, Jul. 9, 2015; https://www.plixer.com/blog/general/ziften-zflow-reporting-support/, 4 pages. [Retrieved Apr. 25, 2019].

Vinny Parla, "An introduction to the new Cisco Network Visibility Flow Protocol (nvzFlow)," Cisco Systems, Nov. 16, 2015; https://blogs.cisco.com/security/an-introduction-to-the-new-cisco-network-visibility-flow-protocol-nvzflow, 10 pages. [Retrieved Apr. 25, 2019].

Cisco Systems, News Release, "Cisco Tetration Analytics: the most Comprehensive Data Center Visibility and Analysis in Real Time, at Scale," Jun. 15, 2016; https://newsroom.cisco.com/press-release-content?type=webcontent&articleId=1772270, 8 pages. [Retrieved Apr. 25, 2019].

* cited by examiner

SUPPLEMENTING NETWORK FLOW ANALYSIS WITH ENDPOINT INFORMATION This application claims the benefit of U.S. Prov. Appl. No. 62/296,326 filed on Feb. 17, 2016, which is incorporated by reference herein in its entirety.

BACKGROUND

It is common design practice for networks to be designed hierarchically, for example as shown in FIG. 1A.

A hierarchical network design such as that shown in FIG. 1A involves dividing the network into discrete layers. Each layer, or tier, in the hierarchy provides specific functions that define its role within the overall network. A typical enterprise hierarchical LAN campus network design, for example, includes the following three layers:
Access Layer 10: Provides workgroup/user access to the network;
Distribution Layer 20: Provides policy-based connectivity and controls the boundary between the access and core layer; and
Core Layer 30: Provides fast transport between distribution switches within the enterprise campus.

The network illustrated above has also been divided into three separate broadcast domains 40A-C, indicated from left to right. The benefit of this arrangement is that traffic within a broadcast domain 40A-C is not passed up to a higher-level of the network. Accordingly, local traffic remains local.

Many information technology organizations monitor network flows to improve network security. One such example of such technology is NETFLOW, which is a feature introduced on CISCO routers that provides the ability to collect Internet Protocol (IP) traffic as it enters or exits an interface of a network device. Various devices in the network may facilitate the collection and analysis of network flow data, including flow collectors and flow analyzers. This collection process allows a network administrator to determine information such as the source and destination of network traffic, class of service, and causes of network congestion. The analysis of flow data may also help in the early detection of cyber-attacks, including malware, Denial of Service (DoS) attacks, and Advanced Persistent Threats. One method for collecting and saving network flow information is by using an IP Flow Information Export (IPFIX) format promulgated by the Internet Assigned Numbers Authority (IANA). This collection of data may be useful in capturing data pertinent to layers 2, 3, and 4 of the OSI reference model (data link, network, and transport layers, respectively).

Another recent trend in computing, particularly enterprise computing, is the shift to cloud infrastructure, such as those provided by AMAZON, MICROSOFT, RACKSPACE, and others. Much of the impetus for the shift is to reduce expenditures and streamline IT and security operations. One recent report found that there had been 1.900% growth in adoption of cloud computing between 2011 and 2014.

Cloud computing is a kind of Internet-based computing in which shared resources, data and information are provided to computers and other devices on-demand. It is a model for enabling ubiquitous, on-demand access to a shared pool of configurable computing resources. Cloud computing and storage solutions provide users and enterprises with various capabilities to store and process their data in third-party data centers. It relies on sharing of resources to achieve coherence and economies of scale.

One concept closely associated with cloud computing is virtualization, which provides a layer of abstraction for computing resources. One type of virtualization involves running programs within a container known as a virtual machine. A virtual machine may allow an application developed for a particular hardware platform to run on the underlying (potentially different) hardware of the cloud computing environment, without any need for modification of the application. It is very common for applications running in the cloud to execute within a virtual machine.

Figure 1A:
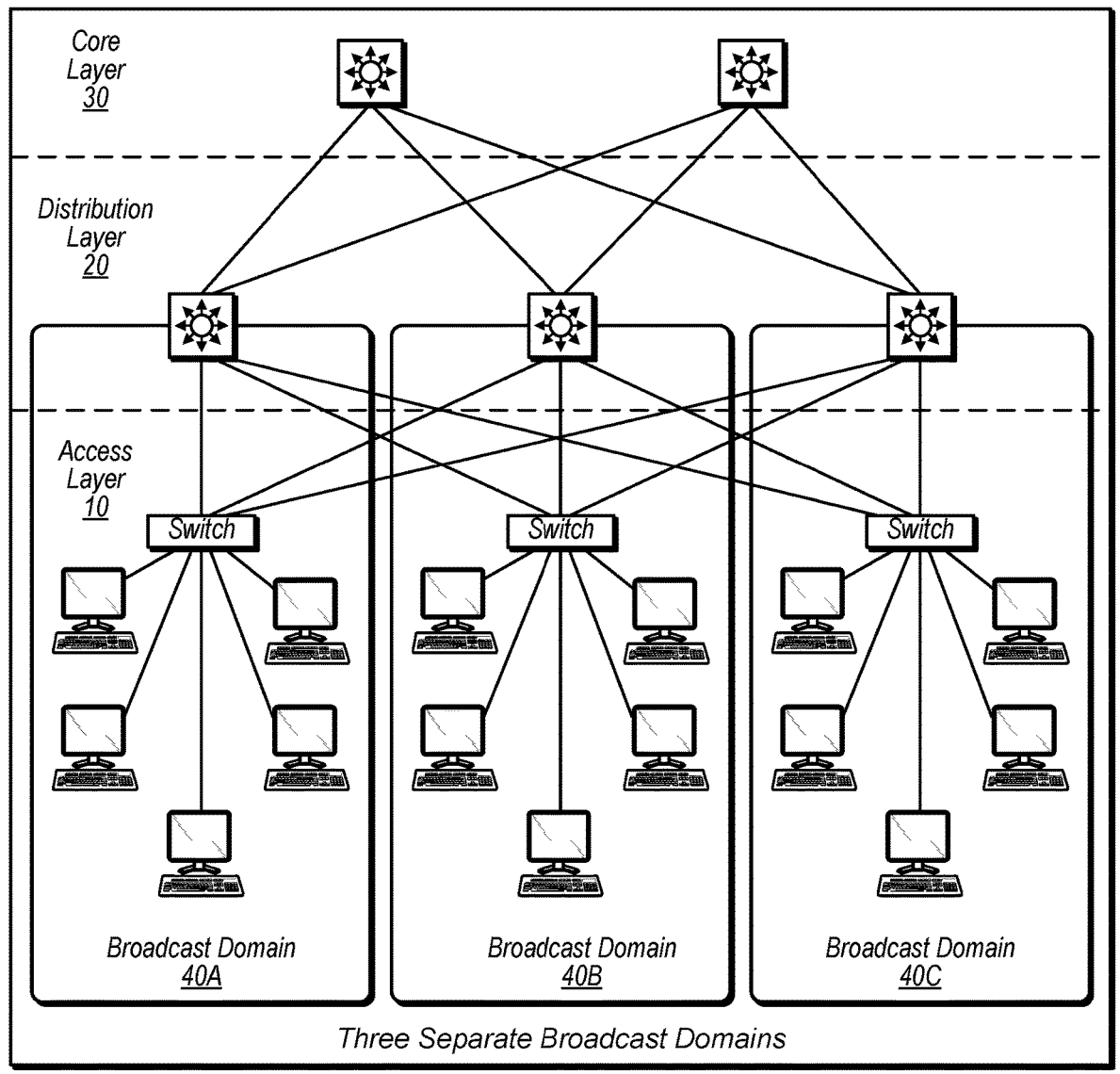
FIG. 1A is a block diagram of a hierarchical network illustrating various layers in a traditional network design.

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. An "endpoint computer system that is configured to collect information about computing activity" is intended to cover, for example, a device or system that performs this function during operation, even if the device/system in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function. After appropriate programming, the FPGA may then be configured to perform that function.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

DETAILED DESCRIPTION

Current standard practice is to implement network flow analysis at locations above the access layer. In such configurations, however, administrators cannot track localized traffic, including LAN-to-LAN activity, local broadcast traffic, and so-called "east-west" traffic that flows between devices and/or applications in the data center. It is complicated to route traffic out of the data center for inspection and then back into the data center—this also leads to increased network traffic and unnecessary bandwidth consumption.

The present inventors have recognized that, in spite of the many current benefits of network flow analysis, current implementations (e.g., limiting network flow analysis to the higher network hierarchy layers) create massive blind spots for network security administrators. As disclosed herein, a solution that addresses this problem is to collect information relating to computing activity at "endpoint computer systems," and use this information to supplement traditional network flow analysis.

As used herein, an "endpoint computer system" is a node associated with the network that can serve as the originating source node or terminating destination node of a network communication. This node may be associated with the network, for example, by being located within the network or by being coupled to the network from an external location via some connection (e.g., a virtual private network (VPN) connection). An endpoint computer system is distinguished from other network nodes that serve to switch, route, or transfer network traffic as it transits the network from an originating source node to a terminating destination node. In some cases, an "endpoint computer system" may be configured to act both as an endpoint node (or collection of endpoint nodes) and as a switching or routing node. This arrangement is common in virtualized networks or systems, in which a computing system may host multiple virtual machines with an interconnecting virtual network. This scenario is also possible, for example, in (non-hierarchical) mesh networks, where any node in the mesh may source, sink, transfer, switch, or route network traffic. Thus, a given physical network node may be configured to a single network role or to multiple roles, depending upon the network architecture and degree of virtualization. But as stated above, an "endpoint computer system" is one that can act as a source or destination node of a network communication.

In some instances, endpoint computer systems may include desktop computers, laptop computers, server computers, and mobile devices (e.g., phone or tablets) within the access or lowest network layer, and stand in contrast to computer systems that are located at higher layers within the network infrastructure, particularly the distribution and core layers. Many "endpoint computer systems" are configured to communicate with an associated network via a network interface, and further configured to support user interaction via human interface devices, including, but not limited to, a keyboard, and some means of pointing and selecting objects on a display of the endpoint computer system (e.g., mouse, touch screen display, etc.). Other "endpoint computer systems" are servers in the access or lowest network layer, such as those located within an entity's data center. Endpoint computer systems do not, for example, encompass computing devices located at higher layers of the network hierarchy that are not configured to serve as the source or destination node for a network communication, including layers configured to route network traffic between different broadcast domains.

An "endpoint computer system" may also include apparatuses within the so-called Internet of Things (IoT), including physical objects such as devices, vehicles, buildings, and other items that are embedded within electronics, software, sensors, and network connectivity that enable these objects to collect and exchange data. Within an enterprise computing environment, an IoT could include almost any conceivable device, including printers, scanners, desk phones, electronic door locks, badge readers, security cameras, smart buildings, industrial control systems, etc.

Figure 1B:
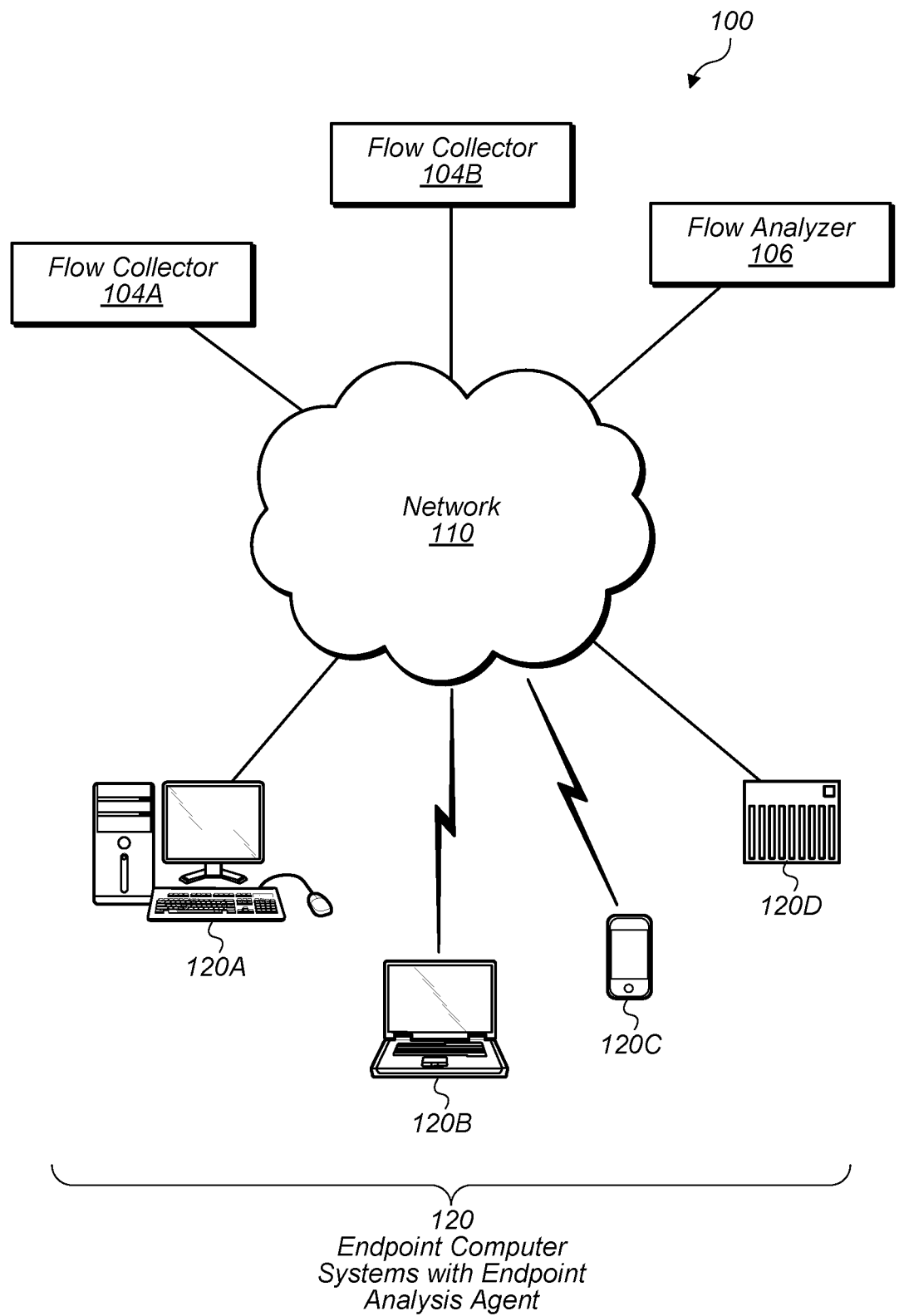
FIG. 1B is a block diagram of a computer network with flow collection and analysis devices and endpoint computer systems with endpoint analysis agents according to the present disclosure.

Turning now to FIG. 1B, a block diagram is shown of a system 100 that implements an endpoint information collection architecture. System 100 includes a network 110, which is coupled to various network flow devices—namely, flow collectors 104A-B and flow analyzer 106. Network 110 is also coupled to several representative endpoint computer systems 120. Shown are desktop computer 120A, laptop computer 120B, mobile phone 120C, and data center server computer 120D. These are representative of numerous types of endpoint computer systems that may be connected to network 110.

Information may therefore be collected regarding computing activity on endpoint computer systems in a manner that does not rely on the network infrastructure. This capability allows collection not only of traditional data from OSI layers 3 and 4, such as source and destination IP addresses and ports, but also provides additional valuable information associated with OSI layers 4-7, including, for example, the executable responsible for a particular network socket, an associated cryptographic hash (e.g., MD5, SHA1, SHA2, SHA 256, etc.), process and file path of the executable, the user responsible for launching the executable, and whether the executable is being run in the foreground or background of the endpoint. (A "foreground" process is one that is actively selected by the user, as opposed to a "background" process associated with a minimized window or other system activity.) This paradigm thus provides "last-mile" visibility to provide additional information about network flows. As used herein, the phrase "network flow" is to be broadly understood according to its ordinary meaning in the art, which includes, at least in some embodiments, a unidirectional sequence of packets being transmitted within a network. In various embodiments, the sequence of packets may share certain characteristics (e.g., same source and destination IP addresses). Similarly, "network flow data" is to be understood according to its ordinary meaning in the art, which includes information about a network flow within a network.

Information collected at endpoints may then be sent to devices in the network (or devices external to the network such as cloud-based devices), such as network flow analyzers, that use this information to supplement flow information collected within the network infrastructure. For example, if a network administrator is interested in a particular network flow, he or she may choose to review additional endpoint information to obtain a more complete picture of the security situation. In various embodiments, this information may be packaged in a standard network flow data record format. For example, endpoint information may be included in a record that combines standard IANA-defined fields with custom extended fields formatted as IPFIX information elements. As used herein, the phrase "network flow data record" refers to data that is organized in a format that permits the transmission of data regarding a particular network flow, such as from a flow collector to a flow analyzer within a network. Information formatted according to an IPFIX standard is one example of a network flow data record.

Collecting endpoint information and using it to supplement network flow analysis has a number of potential benefits. Because a richer data set providing additional relevant context is being utilized, incidents of false positives for potential network security incidents may be reduced. Additionally, the data provided to analysts, security operations center (SOC) personnel and incident handlers will allow them to quickly investigate the nature of the network traffic and determine if it is malicious or benign. Used in conjunction with network-based alerts (firewall, Intrusion Detection System/Intrusion Prevention (IDS/IPS) systems, web proxies and gateways), the approach disclosed herein may dramatically decrease the amount of time it takes to work through a security incident. This approach also opens network flow analysis to a part of the network (access layer) previously thought too expensive to include. Still further, providing insight into lateral data movement within the data center may allow administrators to more quickly prevent the spread of a cyber-attack.

Accordingly, an endpoint computer system according to the present disclosure may be configured to implement an "endpoint analysis agent," which, as described in more detail with reference to FIG. 2, may refer to hardware, or software executing on hardware. The endpoint computer system is configured to couple to a network that includes a network flow analyzer. The endpoint computer system may further be configured to collect information regarding computing activity internal to the endpoint computer system, and include, in one or more network flow data records, endpoint data based on the collected information. As used herein, "internal" activity refers to activity of the endpoint computer system that is not visible from the network to which the endpoint computer system is coupled. Still further, the endpoint computer system may be configured to transmit the one or more network flow data records within the network such that they are received by the network flow analyzer.

The network flow analyzer may be configured to receive the endpoint data and to receive network flow data from one or more flow collectors within the network. The network flow analyzer may be further configured to perform an analysis of the network based on the network flow data received from the one or more flow collectors. The analysis may further be based on the endpoint data included in the one or more network flow data records transmitted by the endpoint computer system.

As used herein, a "network flow analyzer" is a computing device within a network that is configured to collect network flow data from multiple flow collectors within a network, and to perform network security analysis based on the collected network flow data. A network flow analyzer according to the present disclosure may also base its network security analysis on information received from endpoint computer systems. A network flow analyzer refers to a physical device, which may perform the network security analysis using hardware or software running on hardware. A network flow analyzer may of course perform additional functions in various embodiments and is not merely limited to performing a network security analysis. Similarly, as used herein, a "flow collector" is a computing device within a network that is configured to collect information about network activity. In various embodiments, a flow collector is configured to cause the collected information to be transmitted to a network flow analyzer. As with the network flow analyzer, a flow collector is a physical device, and may collect network flow information using only hardware or software running on hardware. A flow collector may also perform other functions. In various embodiments, a flow collector may receive network flow data from multiple observation points within the network. Further, the generic term "network flow device" is used herein to include any device within a network (i.e., not an endpoint computer system) that is configured to observe or analyze network flows. Flow collectors and network flow analyzers are examples of network flow devices.

In some embodiments, the endpoint analysis agent may include instructions embodied on a non-transitory computer-readable medium that are executable by an endpoint computer system to cause operations such as those described above. As used herein, instructions that are "executable" by a computing device means that, if executed, these instructions will cause the computing device to perform the recited operations. This phrase is also intended to cover the scenario in which a computing device includes the executable instructions, but is not currently configured to execute the instructions. For example, if the recited instructions are part of a software application that is currently disabled, these instructions are nevertheless still "executable" to perform certain operations, the same as if these instructions were part of currently enabled functionality. In other words, the question whether instructions are "executable" on a computing device to perform certain tasks is based on whether those instructions reside on a non-transitory computer-readable medium and not whether those instructions are currently enabled on the computing device (e.g., by some software setting).

Figure 2:
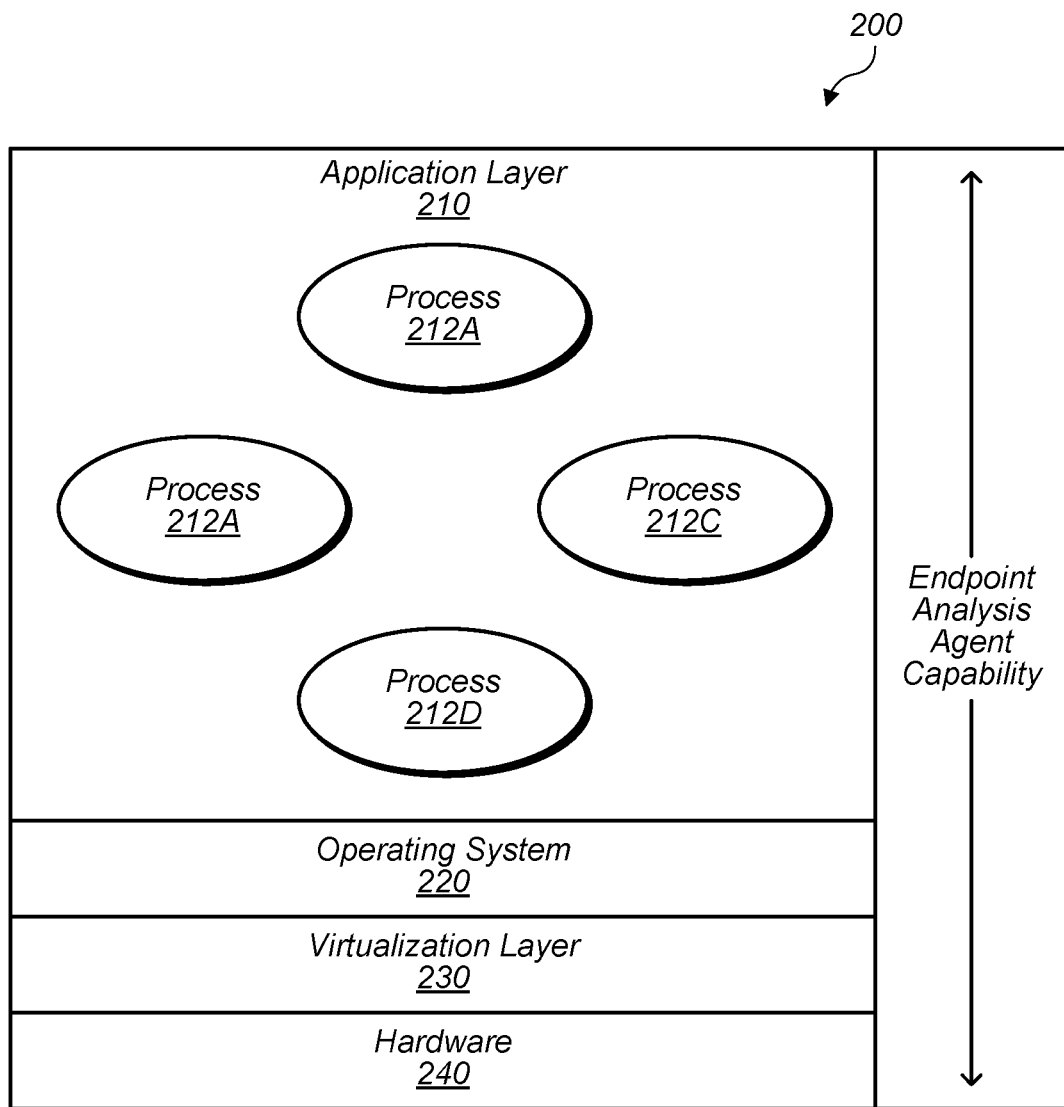
FIG. 2 is a block diagram of an exemplary endpoint computer system illustrating various layers at which an endpoint analysis agent capability may reside.

An endpoint analysis agent may be implemented on an endpoint computer system in a variety of ways, as illustrated by FIG. 2. That figure depicts a diagram 200 for an exemplary endpoint computer system 120, which is shown as potentially having various layers: application layer 210, operating system layer 220, virtualization layer 230, and hardware layer 240. As shown, application layer includes representative processes 212A-D.

Figure 3:
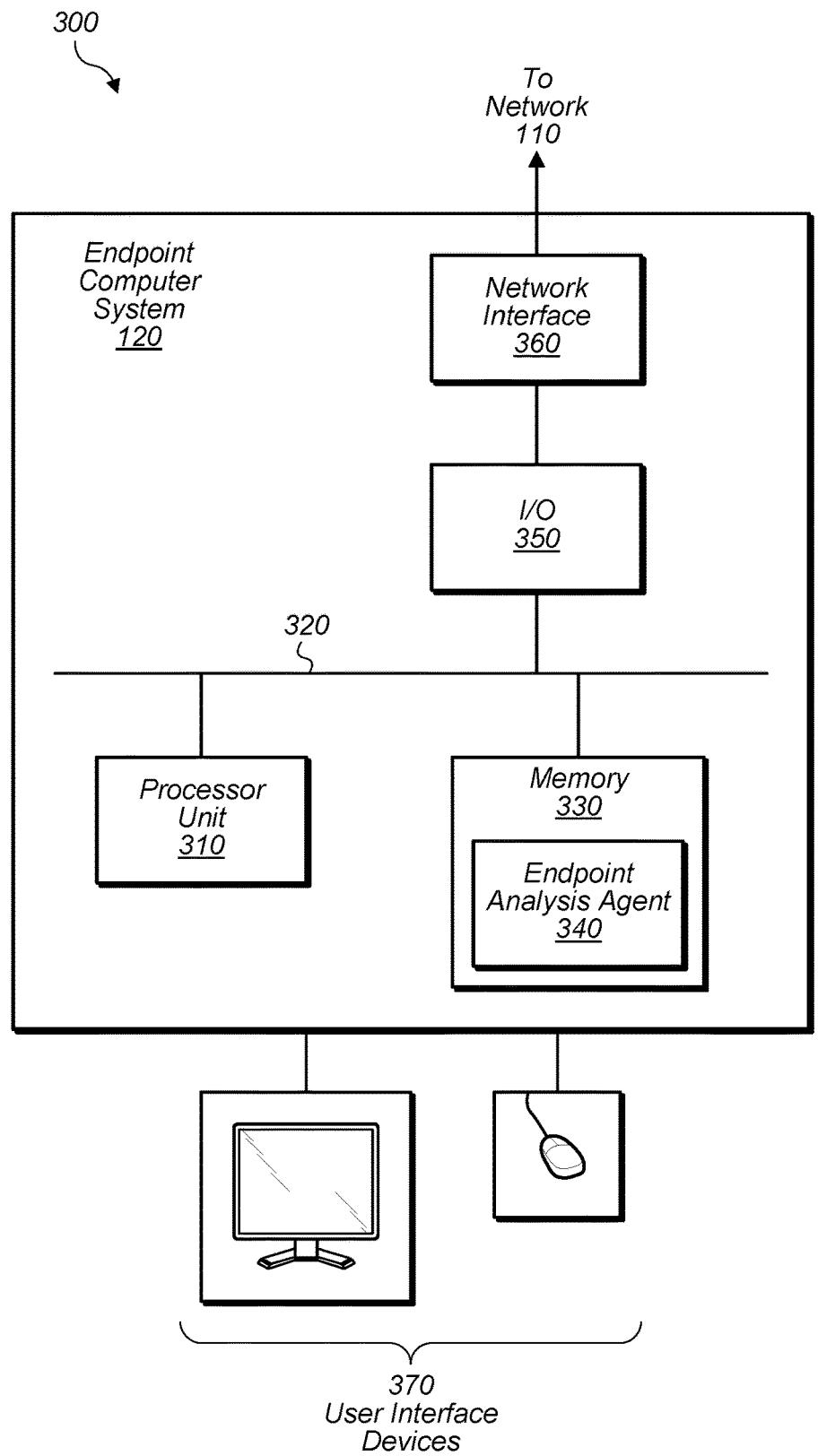
FIG. 3 is a block diagram of an exemplary endpoint computer system according to the present disclosure.

In the depicted configuration, endpoint computer system 120 includes a hardware layer 240, which includes the actual underlying hardware of the system that supports process execution (e.g., processors, memory), and is discussed further with reference to FIG. 3. Endpoint computer system 120 further includes an operating system layer 220 that supports multiple system and application processes 212, including, in some embodiments, an endpoint analysis agent process. Some systems 120 may further include a virtualization layer 230 situated between operating system 220 and hardware 240. Virtualization layer 230 may, in various embodiments, include a hypervisor, a virtual machine manager, or some other type of virtual container.

As indicated in FIG. 2, the agent capability may be implemented at any level or levels in the diagram, including as an application process 212 above operating system 220 in application layer 210, as part of operating system 220 (e.g., a kernel or driver component), as part of virtualization layer 230, or even as part of the system hardware 240. (Note that system hardware 240 or operating system layer 220 may be virtualized by virtualization layer 230.) Physical or virtual hardware access may be mediated by operating system layer 220 using system-provided application programming interfaces (APIs). The endpoint analysis agent may interact with operating system layer 220 via these APIs to instrument and track a variety of information, such as that discussed in detail below with reference to FIG. 4.

Endpoint analysis agent may exist as part of the operating system layer 220, as an installed driver within operating system layer 220, as a module within virtualization layer 230, or even as part of the underlying hardware 240. The agent capability may exploit any combination of layers, each with their own specific instrumentation interfaces as incorporated in their design. Lower level instrumentation, such as in the hardware or virtualization layer, may provide visibility to endpoint operation aspects that are hidden at higher levels. The reverse may also hold true, where higher level software abstractions are not as visible at lower instrumentation layers. Choice of agent capability layering is thus an implementation choice. Note that in a system such as system 100 depicted in FIG. 1*b*, the endpoint analysis agent capability may be implemented variously in different ones of endpoint computer systems 120. It may make sense to implement the agent capability differently in a data center server as compared to a mobile phone, for example.

In some cases, the endpoint analysis agent may implement discontinuous monitoring of an endpoint, such that the agent is active or inactive at different times. For example, the endpoint analysis agent may be "dissolvable" such that it is not continuously installed or enabled. A dissolvable agent may install itself in order to collect information from an endpoint, and once the information is collected (e.g., a scan is performed), the agent will remove itself from the endpoint.

In some enterprise environments, it is generally disfavored to install and maintain agent software of any kind on endpoints. In such environments, a remote endpoint analysis agent may be located on another system, typically a server, that periodically polls the endpoint to collect monitoring information. Whereas a local agent using operating system-provided APIs to collect this information, if these calls are exposed remotely, e.g., via remote procedure calls (RPC), then the agent could reside on a remote system and use the RPC mechanism to make the API calls. In many cases, there are additional delays and network operation overhead to implement this paradigm continuously, so it is not always practical to remotely monitor endpoints continuously as it would be locally. Often, such a remote arrangement would be periodic or intermittent. For very inexpensive or primitive endpoints (as in IoT settings), this may be the only agent option. In some embodiments, the remote agent paradigm may be implemented in WINDOWS computer using Remote Windows Management Instrumentation (WMI).

More generally, the endpoint analysis agent can be said to be virtualized (i.e., not physically present on the endpoint), and operate remotely over the network. In sum, endpoint analysis agent may be implemented in several different ways with respect to an endpoint computer system.

Turning now to FIG. 3, a block diagram of a system 300 is shown that includes an exemplary endpoint computer system. In this particular configuration, endpoint analysis agent 340 is implemented in software—for example, according to one of the arrangements described above with reference to FIG. 2. But as previously noted, in other embodiments endpoint analysis agent may be implemented differently in other systems, such as in a hardware module.

As shown, system 300 includes endpoint computer system 120, which is coupled to network 110 and, in some embodiments, user interface devices 370. In the illustrated embodiment, endpoint computer system 120 includes a processor unit 310 that is coupled to a system memory 330 and I/O interfaces(s) 350 via an interconnect 320 (e.g., a system bus or chipset interface). I/O interface(s) 350 is coupled to one or more I/O devices, only one of which, network interface 360, is depicted in FIG. 3. Endpoint computer system 120 may be any of various types of devices within the definition of this term provided above, including, but not limited to, an access layer server system, personal computer system, desktop computer, laptop or notebook computer, data center computer system, tablet computer, handheld computer, workstation, a consumer device such as a mobile phone, music player, or personal data assistant (PDA), an embedded system, etc. Although a single system 300 is shown in FIG. 3 for convenience, system 300 may also be implemented as two or more computer systems operating together.

Processor unit 310 is a circuit that may include one or more processors or processing elements. In various embodiments of system 300, multiple instances of processor unit 310 may be coupled to interconnect 320. In various embodiments, processor unit 310 (or each processing element within 310) may contain a cache or other form of on-board memory. In the depicted embodiment, endpoint analysis agent 340 described above is executable by processor unit 310 at one or more of the various software layers described with reference to FIG. 2.

System memory 330 is usable to store program instructions executable by processor unit 310 to cause system 300 to perform various operations described herein. System memory is also usable to store data for access by processor unit 310. System memory 330 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 300 is not limited to primary storage such as memory 330. Rather, computer system 300 may also include other forms of storage such as cache memory in processor unit 310 and secondary storage on I/O Devices 350 (e.g., a hard drive, storage array, etc.). In some embodiments, these other forms of storage may also store program instructions executable by processor unit 310 to perform operations described herein.

I/O interfaces 350 may be any of various types of interfaces configured to couple to and communicate with other devices, according to various embodiments. In one embodiment, I/O interface 350 is a bridge chip (e.g., Southbridge) from a front-side bus to one or more back-side buses. I/O interfaces 350 may be coupled to one or more I/O devices via one or more corresponding buses or other interfaces. Examples of I/O devices include storage devices (hard drive, optical drive, removable flash drive, storage array, SAN, or their associated controller), network interface devices (e.g., to a local or wide-area network), or other devices (e.g., graphics, user interface devices, etc.). In the illustrated embodiment, computer system 300 is coupled to network 110 via a network interface circuit 360 (e.g., configured to communicate over WiFi, Bluetooth, Ethernet, etc.).

Figure 4:
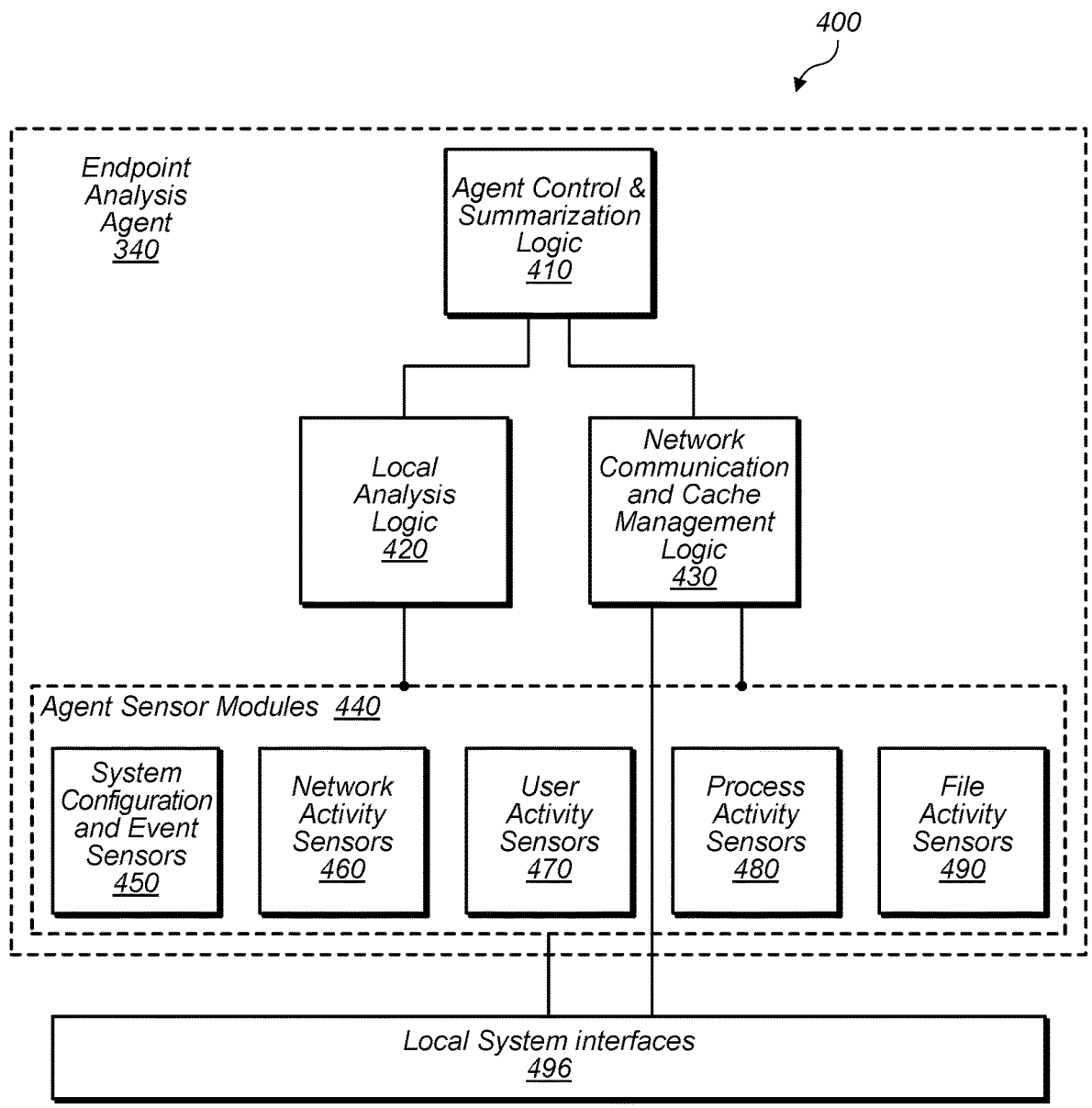
FIG. 4 is a block diagram depicting a logical arrangement of an exemplary endpoint analysis agent.

Turning now to FIG. 4, a block diagram is shown of a system 400 that includes an exemplary endpoint analysis agent 340 and local system interfaces 496. The representation of endpoint analysis agent 340 depicted in FIG. 4 is a logical one, with various modules and sensors depicted as distinct entities for ease of explanation. In various embodiments, these logical elements may be implemented differently (e.g., with different divisions between sensor modules 440) in other embodiments.

Local system interfaces 496 depicted in FIG. 4 refers to any hardware or software resource accessible by agent sensor modules 440. For example, local system interfaces 496 may include network interface 360 that is coupleable to a network such as network 110. Network interface 360 may include hardware and software elements in various embodiments. Interfaces 496 may also include various operating system-exposed application programming interfaces (APIs), which may allow various ones of agent sensor modules 440 to collect information about computing activity on an endpoint computer system 120. For example, an operating system may provide an API that returns to a querying process a list of active processes on system 120. In short, local system interfaces 496 represents any resources accessible by endpoint analysis agent 340 and its submodules.

Agent sensor modules 440 refer to computer program instructions that are executable to collect information regarding endpoint computer system 120, and particularly information relating to computing activity within system 120 that is not visible from network 110. The various depicted modules, 450, 460, 470, 480, and 490, are shown separately for ease of explanation, but can be combined in any suitable manner into a greater or fewer number of modules.

System event and configuration sensors 450 refer to computer program instructions that are executable to collect information regarding the configuration of endpoint computer system 120 or events that may occur on such a system. In various embodiments, sensors 450 may determine system identity information, such as the hostname, IP address, MAC address, and serial number of system 120. Any other suitable type of system identity information may also be determined, such as an inventory tracking number for system 120, or other enterprise-assigned tags or attributes. Additionally, sensors 450 may further determine location information for system 120—for example, geographic locale, the building in which the system is located, what portion of a network system 120 is logged into, etc. Sensors 450 may further determine the hardware configuration of system 120—that is, the peripherals, storage devices, network interfaces, or other hardware resources of the system. Sensors 450 may also be operable to determine the state of a registry or other configuration file of system 120.

Sensors 450 may further be operable to collect system compliance information. The nature of this information is well understood in the art, and encompasses a variety of information, including, but not limited to, operating system version installed, patches installed (e.g., OS, driver, and application patches), encryption status (e.g., whether data is fully encrypted as may be required in some systems to prevent data theft should the endpoint fall into the wrong hands), known vulnerabilities, the presence or absence of so-called mandated agents (e.g., programs designed for security, management, backup, etc.), and whether certain mandated configuration settings have been applied.

Still further, sensors 450 may also include event sensors. These sensors may record, for example, the occurrence of various software events and/or faults, particularly those that are not detectable with remaining sensors 460, 470, 480, or 490. For example, MICROSOFT WINDOWS operating systems support extensive logging and auditing features that may not be entirely exposed through APIs. Thus, event sensors 450 may be used to access such information.

Network activity sensors 460, as their name suggests, refer to computer program instructions that are executable to collect information relating to network activity. For example, sensors 460 may collect source and destination network address and port information for active network connections—such information may be usable in matching endpoint computing activity with network-observed flow activity. Sensors 460 may also collect information about the volume of network traffic including, for example, an amount of data sent or received on each connection, either in total for that connection or broken down by time period. Similarly, for each active network connection of endpoint computer system 120, sensors 460 may identify each process that corresponds to one of the connections (i.e., the "communicating process"), as well as its image file path and file name, cryptographic hash value and image metadata, and process command line. Collecting this information may, in some instances, require multiple API calls. For example, image metadata and cryptographic hash value information may be collected from the file system, while network contact information such as addresses and ports may be collected from the network system.

Sensors 460 are not limited to observing network activity relating to active connections, however. For example, sensors 460 may detect failed Domain Name Service (DNS) lookup requests, which may, in some instances, be indicative of malware attempts using domain generation algorithms. Similarly, sensors 460 may also detect other types of failed connection attempts, which might indicate attempts by endpoint computer system 120 to passively scan the network or manipulate Address Resolution Protocol (ARP) requests—for example, to facilitate man-in-the-middle attacks or ARP cache poisoning.

User activity sensors 470 include computer program instructions that are executable to collect information relating to users of endpoint computer system 120. For example, in various embodiments, sensors 470 may indicate what users are currently logged in to endpoint computer system 120 and whether each login is local or remote. Sensors 470 may further indicate associated account attribution for observed network activity such as identifying which logged-in users or accounts correspond to particular observed network activity. (Note that, as a general matter, certain types of information could arguably fit into multiples ones of the disclosed sensors; this functionality could also be handled by network activity sensors 460, for example.)

Sensors 470 may also collect information about the activities of users. For example, sensors 470 may collect information relating to user activity or inactivity, such as whether there is any input being supplied by the user (e.g., through user interface devices 370). Sensors 470 may also determine what user process are in the foreground (e.g., the identity of the process associated with a currently active window, such as a word processing program to which the user is currently inputting text, as compared to other processes running in the background). Additionally, sensors 470 may keep a list of recent foreground processes. A foreground process may be identified, in some embodiments, at the level of a particular tab of a browser program.

Process activity sensors 480 include computer program instructions that are executable to collect information identifying the contexts in which processes execute on endpoint computer system 120. Most basically, sensors 480 may determine an inventory of current endpoint system processes. Additionally, sensors 480 may determine the activity profiles of these processes, as well as indication of their consumption of system resources. Historical information may also be collected, such as process creation and termination times. Still further, sensors 480 may collect process hierarchy information, such as parent and child process of a given process (particularly a process involved with network activity—a communicating process). The means of process creation may also be collected—for example, whether a process such as a communicating process is likely to be user-initiated (as well as what particular account or user initiated creation) as opposed to automatically started in the background. Finally, various types of process identifying characteristics may be collected, including version metadata, cryptographic hash value, file path, and so on. This collected contextual information may be useful to a network flow analyzer attempting to correlate network activity with endpoint activity such as identifying a particular process from which network activity originated.

Finally, file activity sensors 490 are computer program instructions executable to collect information relating to files on or accessible by endpoint computer system 120. For example, sensors 490 may indicate what files are being accessed, the frequency of access, the identity of the process or user accessing the file, and information about the volume of network traffic associated with accessing files. This information, along with various other types of information collected by sensors 440, may be useful to network flow analyzer 106 in matching network activity with endpoint activity. For example, network-observed activity may be correlated with a particular process, user, and file based on information collected by sensors 480, 470, and 490, respectively.

Collectively, agent summarization and control logic 410, local analysis logic 420, and network communication and cache logic 430 take the information collected by sensors 440, perform an optional local analysis, and determine the format, granularity, and size of the data, which may be sent to network 110 via local system interfaces 496 and/or cached for later use.

In various embodiments, the information collected by sensors 440 may be initially processed by computer program instructions in local analysis logic 420. This processing may take the form of lightweight pre-processing relative to further processing that may occur at network flow analyzer 106. For example, local analysis logic 420 may be programmed to look for certain sequences of operations, such as failed DNS look ups. Similarly, logic 420 may look for so-called indicators of compromise (e.g., signatures of known malware or attacks) or for common applications communicating over unusual port numbers. In this manner, local analysis logic 420 may provide a preliminary risk assessment for activity relating to endpoint computer system 120. This information may be used by agent control and summarization logic 410 to determine what data is to be sent and in what format. In some embodiments, multiple ones of endpoint computer systems 120 in a network may each perform a local analysis, thus lightening the processing load on network flow analyzer 106.

Agent summarization and control logic 410 includes computer program instructions that are executable to exercise overall control over endpoint analysis agent. Logic 410, in one embodiment, is operable to determine what data to send and in what format. For example, information provided by local analysis logic 420 may indicate how important currently collected information is—for example, how likely is it that the collected information corresponds to a security threat. This may be useful in determining whether or not to send certain data to network 110 for further processing. Additionally, logic 410 may also be operable to determine the format used to send data to network 110. As will be described below, certain data reduction operations may be performed on collected data, so that not all collected data is sent over the network. Instead, data corresponding to particular times may be transmitted. Alternately, compression may be performed on collected data. Still further, collected data may be abstracted or summarized to reduce level of detail and time granularity.

In one embodiment, network communication and cache management logic 430 is responsible for communicating data to network 110 in the chosen format via local system interfaces 496. Logic 430 may also be responsible for performing the previously mentioned data reduction operations (this may also be performed by logic 410 in other embodiments). Finally, as its name suggests, logic 430 is also responsible for caching data, such as during periods when an endpoint computer system 120 is not in contact with to network 110, such as when system 120 loses connectivity, when network bandwidth is too expensive (e.g., a satellite link), or when it is determined that network activity may exhaust too much battery power (e.g., as in the case of a mobile device).

The data collected by sensor modules 440 may be assembled (e.g., by control logic 410 and/or cache logic 430) into network flow data records that are far more informative than traditional network flow data, which commonly does little more than identify a network address of an endpoint computer system 120. Instead, in various embodiments, endpoint analysis agent includes endpoint activity information in extended network flow data records. The Internet Engineering Task Force's IP Information Flow Export (IETF's IPFIX) standards, for example, provide an extensible flow data record format. Use of such a format allows information to be conveyed in a format similar to that currently in use within the industry. But by exploiting this flow data extensibility, additional endpoint security context may be provided, enabling far more specific analysis by the network flow analyzers to more accurately identify and prioritize network security threats. The present disclosure is not limited, of course, to use of the IPFIX standards. Instead, flow data may be conveyed using any other extensible formats or proprietary formats used by commercial network security infrastructure providers. Accordingly, sensor modules 440 may assemble any suitable data records associated with user activity, file access, registry operations, performance characteristics, device attach/detach, location data, log/audit events, etc.

An exemplary format for an extended network data flow record is shown Appendix A. This format includes several IANA-defined fields for a network flow, such as source and destination addresses, and timestamp of the first packet for the flow. Additionally, Appendix A indicates a number of extended fields, identified by the "zflow" prefix. Examples of additional data that can be communicated using this format include process id, parent process id, path and filename of the executable image, operating system name and build version. As noted, any type of information that may be collected by sensors 440 may be included within a network flow data record.

Once properly formatted, network logic 430 is configured to transmit the network flow data records to one or more network flow devices in network 110. These transmissions may either be unicast (i.e., sent to one network flow device in network 110) or multicast (i.e., sent to multiple network flow devices). Note that network flow analyzers that ultimately will be processing the flow data records may need to be modified to recognize the extended flow data records and correlate this additional data with network-observed flow data.

As mentioned, cache logic 430 is operable to cache information collected by sensors 440. In some instances, cache logic 430 may be used to implement temporary storage and buffering of the collected information, particularly while endpoint analysis agent 340 is determining when and at what level of detail to forward this information over the network to network flow data analyzers and flow collectors. Cache logic 430 may also serve to retain collected information over periods of loss of network contact between endpoint analysis agent 340 and its associated data analyzers or collectors. Alternatively, cache logic 430 may be operable to retain data for a configurable holding period. During this period, analyzers may request additional data detail from cache logic 430. For example, cache logic 430 may send summarized data to network flow analyzer 106. Flow analyzer 106, upon analyzing this data, may determine that additional data detail is needed to complete its analysis. In some embodiments, if a request for this additional detail is made during the holding period, cache logic 430 can supply this information.

The ability of cache logic 430 to retain collected information is particularly useful for mobile endpoints, which are configured to decouple from networks, such that they are not in communication with network flow devices. Cache logic 430 serves to hold data until a connection is re-established. In some embodiments, data can be forwarded to the network via cloud servers for subsequent secure relay to network flow devices, such as in an enterprise network. By continually monitoring the activity of endpoint computer systems 120 whether or not they are connected to the network, certain blind spots that previously existed from a network administrator viewpoint are eliminated. This solution allows application, for example, of an enterprise policy to a device that is decoupled from the enterprise network. (A decoupled device may actually need more intensive monitoring since the endpoint is not behind enterprise perimeter defenses.)

Because sensor modules 440 may collect large amounts of data, it may be desirable to reduce the amount of data transmitted to network flow devices for analysis. This may be accomplished with various types of data reduction operations. For example, data may be summarized. As one example, unique network targets contacted over a specified time period may be reported, such as daily or since the last boot. This represents a reduction of data as compared to reporting repetitive contacts to the same network target. This approach avoids the high overhead of always supplying full data flow detail across all monitored endpoints, when only a small fraction of network activity justifies this detailed level of examination.

Data may be summarized on additional various criteria, including novelty, importance, or risk. Still further, data may be reduced by various other means, including compression techniques, or only reporting selected or random data. Cache logic 430 may also selectively abstract context and attribution data, either through a static configuration or using dynamic risk assessment to determine the appropriate level of data detail. Dynamic risk assessment tracks the current risk level associated with the system, user, process, and network activity, for example based upon how usual versus unusual the activity pattern appears. Depending upon the sophistication of the risk assessment algorithm, this could be as simple as a green/yellow/orange/red risk categorization or as complex as a multi-dimensional risk quantification vector.

As described above, endpoint analysis agent 340 is operable to collect endpoint information, package that information (or a subset of that information) in one or more network flow data records, and send those records to network 110, where it may be received either by network flow analyzer 106, or by network flow collector 104, where it may be ultimately forwarded to analyzer 106.

Figure 5:
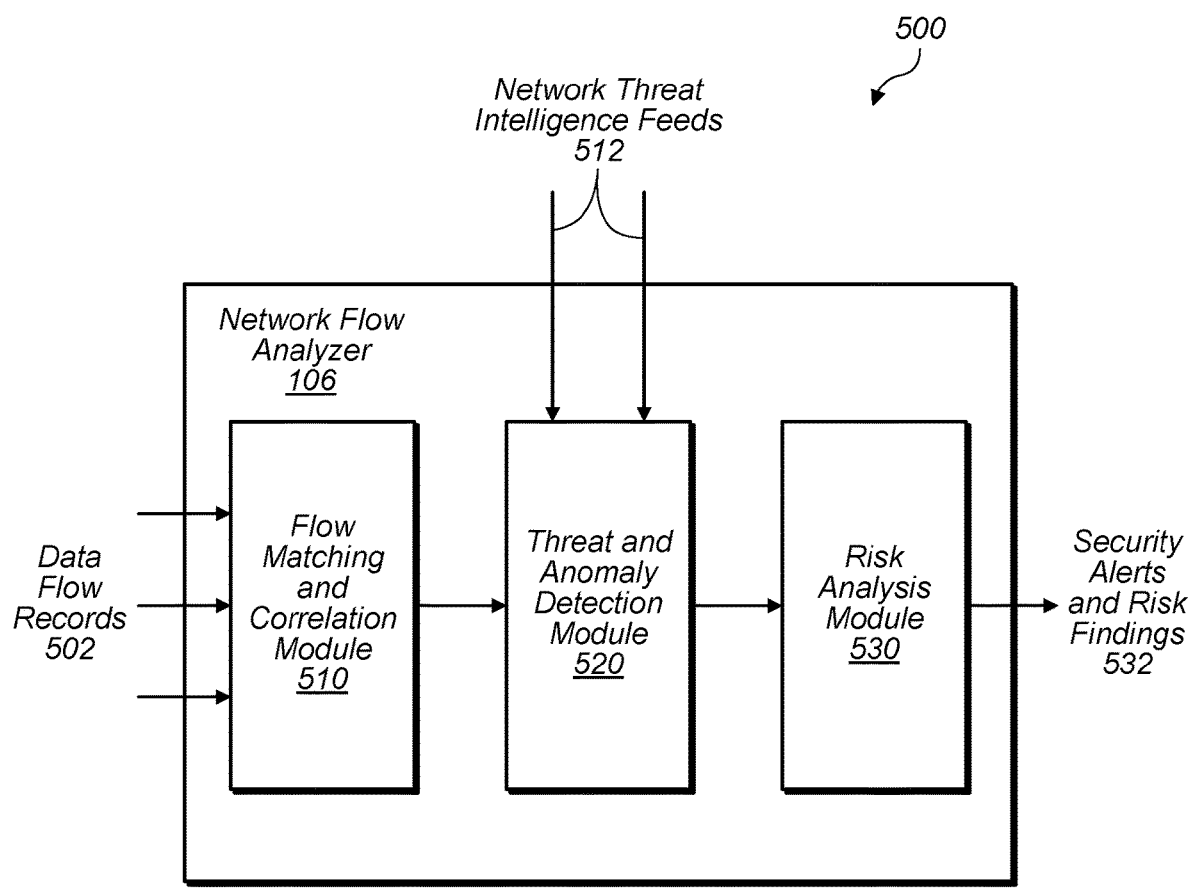
FIG. 5 is a block diagram depicting an exemplary logical arrangement of a network flow analyzer.

Turning now to FIG. 5, a block diagram of a system 500 that includes network flow analyzer 106 is shown. As depicted, network flow analyzer 106 includes flow matching module 510, threat and anomaly detection module 520, and risk analysis module 530. These modules may be implemented either in hardware, software, or a combination thereof.

Flow matching module 510, in various embodiments, receives data flow records 502. Some of these records may include traditional (i.e., non-endpoint) flow information, while others may include endpoint information such as that produced by endpoint analysis agent 340 as described above. Some records may include a combination of both types of flow information.

Module 510 may include computer program instructions executable to match, or correlate, information about a flow observed within the network infrastructure with endpoint information that corresponds to that flow. Accordingly, any or all of the endpoint data collected by endpoint analysis agent 340 (e.g., process id, foreground/background process, executable file name and path, etc.) may be associated with a corresponding flow within the infrastructure of network 110. In some embodiments, this association may take the form of including additional information within a data structure maintained by network flow analyzer 106 for a particular network flow. In other embodiments, the endpoint data may be linked to a data structure for a particular network flow.

As used herein, "matching" endpoint information with network flow data is intended to broadly cover any process in which endpoint information is used to supplement network-observed flow data. Endpoint information about a particular process executing on an endpoint computer system may be used to augment information about an associated network flow. For example, information about a particular network flow (received from a flow collector) can be supplemented with endpoint information, such as the identity of the process on an endpoint computer system that initiated the particular network flow.

With network and endpoint information associated in some fashion, the consolidated information may be forwarded to threat and anomaly detection module 520.

In some embodiments, module 520 includes computer program instructions that are executable to determine whether network activity should be classified as potential threat or anomaly. As shown, module 520, in some embodiments, may receive network threat intelligence feeds 512. Feeds 512 refer to any third-party data that provides information regarding known cyber-threats. Module 520 then uses a set of rules or heuristics, optionally in conjunction with feeds 512, to make a threat assessment determination.

Consider an example in which a port 80 connection is being made to Internet destination 23.64.171.27. This may be the extent of information discernible by traditional network-based flow collection tools. Given this information, a network analyst may dismiss this alert as a false positive. But because endpoint information has been collected by endpoint analysis agent 340 and sent to network flow analyzer 106, the port 80 connection may be correlated by flow matching module 510 with information indicating that the connection was not initiated by a web browser, but rather through a task automation program such as a WINDOWS POWERSHELL. Additionally, module 510 may also determine that the connection was initiated by the "System" account and not a logged-in user. Additional information may also be determined, such as what actions were taken before and after the connection (malicious processes tend to perform actions before and after connections that constitute a recognizable attack pattern), as well as a history of endpoint process activity. Such information, when coupled with the network-observed activity, may be used by module 520 in more accurately determining whether network activity constitutes a security threat.

The possibilities for exploiting the disclosed endpoint collection paradigm are numerous. For example, in evaluating anomalously large network traffic flows, endpoint information can be used to determine, for example, whether this is a normal backup operation or a suspect data staging or exfiltration. Endpoint information can help in this determination by knowing the originating process context (e.g., the process identifier of the process creating the activity, process hierarchy information of the process, identifying characteristics of the process, etc. as noted above) and associated account attribution (e.g., the account or user to which the network activity can be attributed). Similarly, a large traffic flow may be traced to downloads by an employee recently separated from employment. Unusual HTTP or HTTPS traffic may also be evaluated, such as by determining whether it originates from a foreground browser process, as opposed, for example, to a background non-browser process. Still further, anomalous network traffic in terms of flow amounts, flow times, or network targets can be resolved by knowing if it is user-initiated traffic versus background traffic, as well as which process and account is associated with the flow. The same also holds true for an anomalous number of network connections or connection attempts. Correlated network and endpoint information may also help distinguish insider attacks from external attacks, for example by determining if the suspect activity is user-initiated versus autonomous, and whether the user login is local (user physically present, which would point to an inside attack) versus remote (potentially compromised user credentials may be employed by external attackers).

Threats and anomalies determined by module 520 may then be passed to risk analysis module 530, which, in some embodiments, includes computer program instructions executable to assign a risk level (e.g., high, medium, low) to these threats and anomalies. Some activity classified as a threat or anomaly may be determined by module 530 to not be a threat at all. Note that in some embodiments, modules 520 and 530 may be combined into a single module.

As shown, module 530, in some embodiments, is operable to output security alerts and risk findings 532. This information may be output, in some embodiments, via a graphical user interface that allows a network security administrator to view, for a particular identified threat or anomaly, endpoint information in addition to the network-observed activity. Such an interface may allow an administrator to more quickly and accurately assess network security risks. Exemplary screenshots of such an interface are shown in Appendix B.

Having discussed exemplary functionality of endpoint analysis agent 340 and network flow analyzer 106, exemplary methods for their operation are next discussed with reference to FIGS. 6 and 7.

Figure 6:
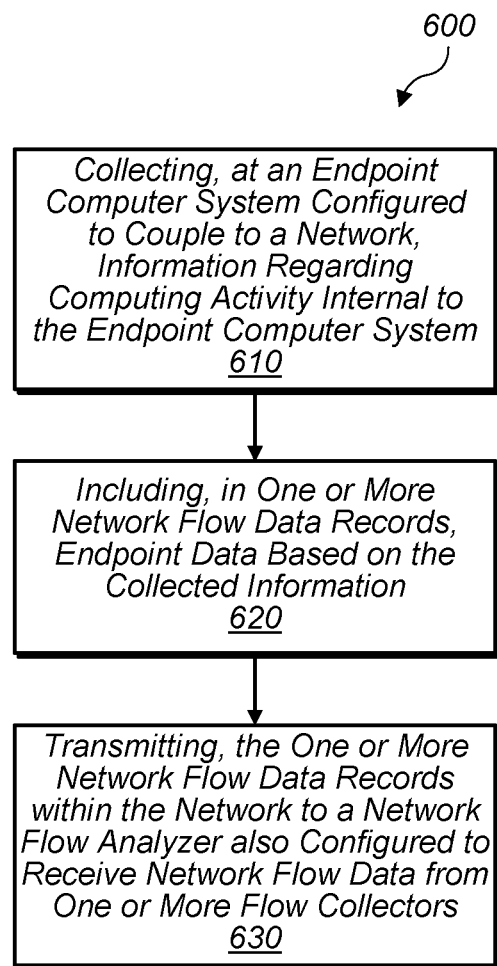
FIG. 6 is a flow diagram of an exemplary method for collection of information relating to computing activity at an endpoint computer system to supplement network flow analysis.

Turning now to FIG. 6, an exemplary method 600 that may be performed by endpoint analysis agent 340 is depicted. Method 600 is not limited in the manner of implementation, and can be performed solely in hardware, or in software executing on hardware. As depicted, method 600 includes steps 610, 620, and 630.

Flow begins with step 610, in which an endpoint computer system (e.g., system 120) configured to couple to a network collects information regarding computing activity internal to the endpoint computer system. The collected information may overlap, in some instances, with information collected by traditional network flow devices, but also includes information relating to the endpoint that is not visible from the network infrastructure. The collected information can include, but is not limited to, any of the types of information described above, such as that collectable by sensor modules 440. For example, this information may pertain to endpoint configuration and events, process activity, user activity, network activity (including failed network activity), and file activity. This information may be stored in any suitable form. Other modules such as agent summarization and control logic 410 may also be involved in the collecting process.

Flow then proceeds to step 620, in which the endpoint computer system includes, in one or more network flow data records, endpoint data based on the collected information. Note that the endpoint data that is actually inserted into the network flow data may be all the raw data that is collected in step 610, a portion of the data collected in step 610, data that is derived from the data collected in step 610, or a combination of derived data and raw data. The derived data may, in some embodiments, be data that is produced in data reduction operations described above. For example, the derived data may be summarized data (e.g., statistics over some particular time period, raw data only during some time period, etc.) or compressed data.

The endpoint data may be included, in step 620, in any suitable data structure. As previously noted, in some embodiments, the endpoint data may be included in an extensible version of a network flow record type that is already recognized by current network flow devices. For example, the network flow data records may be in a format specified by an Internet Engineering Task Force long (IETF) Information Flow Export (IPFIX) standard. Appendix A provides an exemplary format for such a flow record. Any other suitable industry-standard or proprietary format may be used for this purpose.

Flow then proceeds to step 630, in which the endpoint computer system transmits the one or more network flow data records within the network to a network flow analyzer such as network flow analyzer 106. This transmission may be performed in some embodiments by network and cache management logic 430. The transmitted flow data records may, in some instances, be cached data that corresponds to data collected in step 610 while the endpoint computer system was out of communication with the network.

The analyzer is configured to receive the endpoint data and further configured to receive network flow data from one or more flow collectors within the network (which includes at least some network-observed activity as opposed to endpoint activity). The analyzer is further configured to perform an analysis of the network (e.g., a security analysis to detect network vulnerabilities) based on the network flow data received from the one or more flow collectors and further based on the endpoint data included in the one or more network flow data records transmitted by the endpoint computer system. An example of such an analysis is described next.

Figure 7:
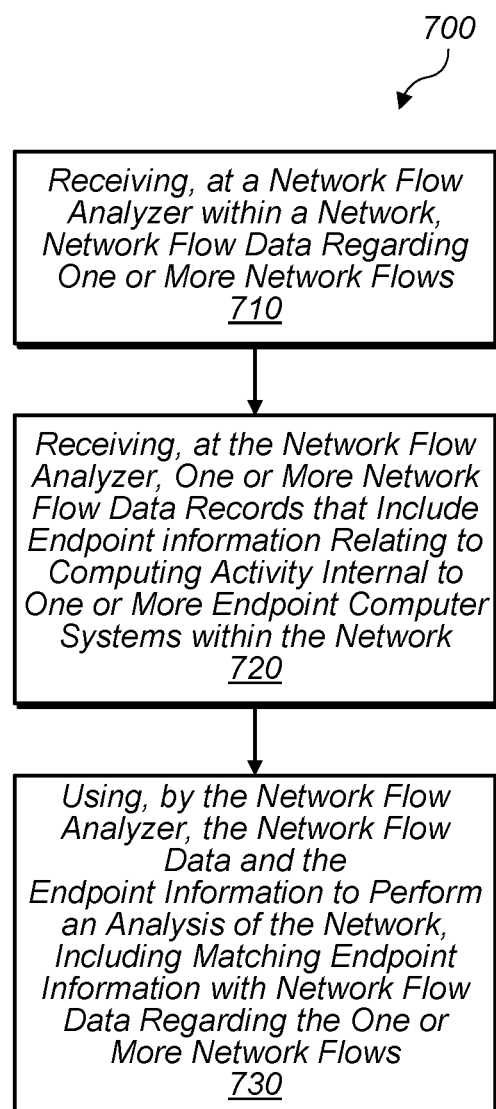
FIG. 7 is a flow diagram of an exemplary method for network flow analysis.

Turning now to FIG. 7, an exemplary method 700 that may be performed by network flow analyzer 106 is shown. As with method 600, method 700 is not limited in the manner of implementation, and can be performed solely in hardware, or in software executing on hardware. As depicted, method 700 includes steps 710, 720, and 730.

Flow begins with step 710, in which a network flow analyzer such as analyzer 106 receives network flow data regarding one or more network flows within the network. This network flow data may include information about activity observed within the network infrastructure (i.e., activity not within an endpoint computer system). The network flow data may be received at the analyzer from one or more flow collectors, another network analyzer, or any other type of network flow device.

Flow then proceeds to step 720, in which the network flow analyzer receives one or more network flow data records that include endpoint information relating to computing activity internal to one or more endpoint computing systems within the network. As noted in the discussion relating to step 620 of method 600, the one or more network flow data records that include the endpoint information may be in any suitable format, including an extended version of an IPFIX standard. The one or more network flow data records, in many instances, will also include information about network-observed activity in addition to the endpoint information.

Flow then proceeds to step 730, in which the network flow analyzer uses the network flow data from the one or more flow collectors and the endpoint information to perform an analysis of the network. This analysis includes matching, or correlating, endpoint information with network flow data regarding the one or more network flows. The matching may be performed, for example, by module 510 described above with reference to FIG. 5. The analysis as a whole may be performed, in some embodiments, by modules 510, 520, and 530 described above. The network analysis may, in various instances, provide a classification of threats, a risk assessment of threats, or merely an interface for a network administrator to explore endpoint information that corresponds to network-observed activity.

The preceding discussion has focused largely on configurations in which endpoint computer systems communicate through on-premise network infrastructure to access computing resources of an entity. The recent shift to cloud-based infrastructure has created a new network paradigm—one that has a fundamental security problem. With on-premise server infrastructure, traditional network-based visibility tools are able to provide insight into network activity because network traffic crosses traditional flow collection points, such as routers, switches, and passive flow sensors. Cloud-based infrastructure, however, breaks this legacy model because at least a portion of the traditional collection infrastructure is now outside of the organization's core network. Due to this lack of visibility, IT and security operations teams have a reduced ability to identify malicious actors, behavioral anomalies, distributed denial-of-service attacks, and network performance issues that impact an organization's ability to deliver its products and services.

Figure 8:
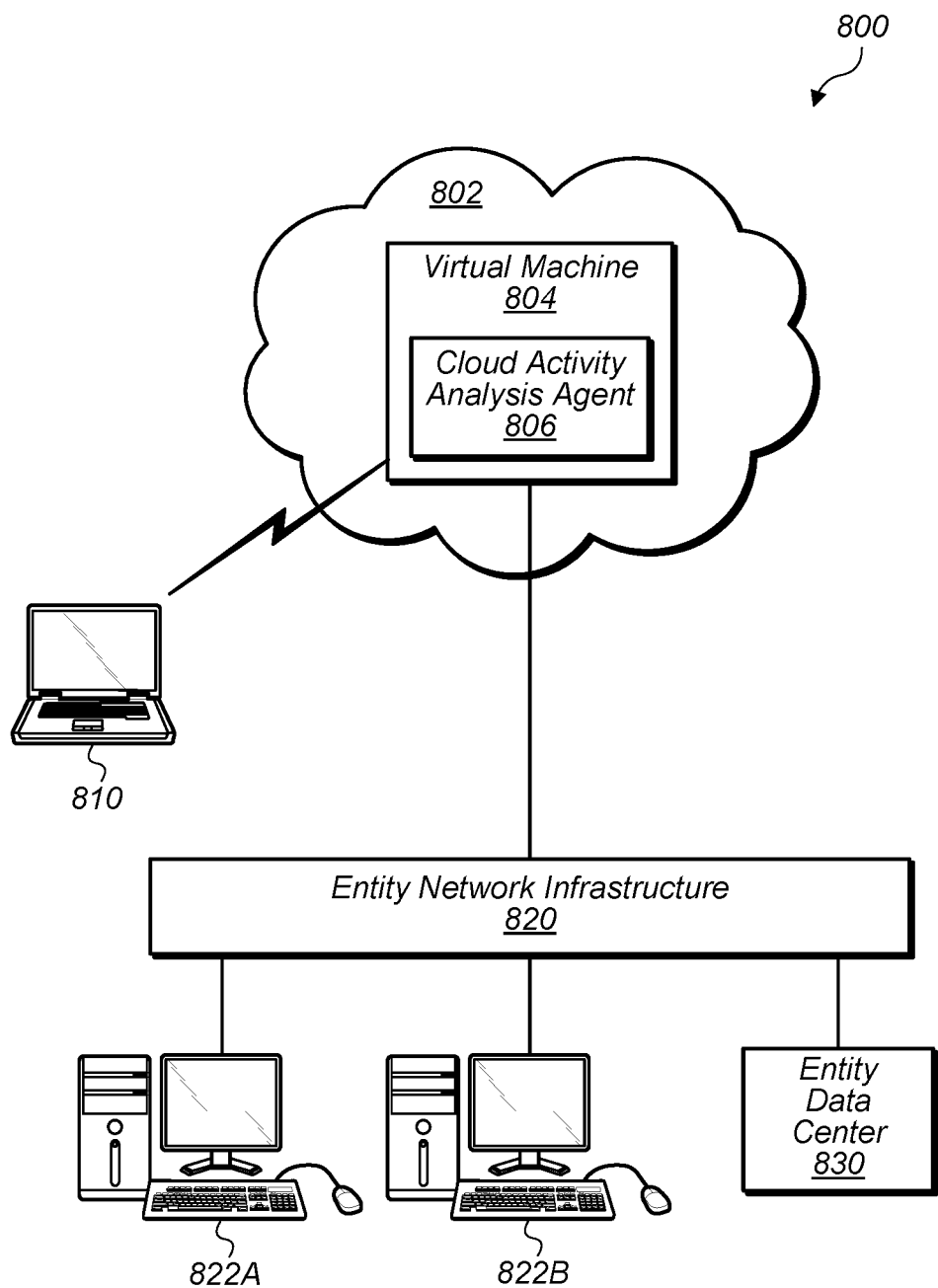
FIG. 8 is a block diagram illustrating the exemplary use of a cloud activity analysis agent within a cloud computing environment.

Turning now to FIG. 8, a block diagram of a system 800 that may ameliorate these problems is depicted. System 800 includes network infrastructure 820 of an entity, such as a company with an enterprise computing environment. Infrastructure 820 may include a variety of network devices, including routers, switches, passive flow sensors, etc., particularly those in higher network levels (e.g., core and distribution layers). Network infrastructure 820 may provide connectivity to computer systems at lower levels (e.g., access layer), such as endpoint computer systems 822A and 822B (depicted as desktop computers but representative of any endpoint system). Network infrastructure 820 may also provide connectivity to a data center 830, which may store and provide access to large amounts of an entity's data.

System 800 further includes a cloud computing environment 802. As shown, cloud computing environment 802 provides an interface to remote computer systems such as remote computer system 810 (depicted as a laptop but representative of any suitable computer system). Remote computer system 810 is operable to connect with cloud computing environment 802 (e.g., through a wireless connection as depicted) to execute an application, which can provide any arbitrary functionality, particularly access to data of the entity. These applications run within virtual machine 804 on underlying hardware of cloud computing environment 802 (not depicted). Input to the application may be provided by a user of remote computer system 810, with the output also provided to computer system 810.

To facilitate analysis of cloud activity, a cloud activity analysis agent 806 may be executed within virtual machine 804. Agent 806 may include functionality similar to that previously disclosed for endpoint analysis agent 340 in some embodiments, such that the preceding discussion of agent 340 applies equally to agent 806. Note that computer system 810 may also include an endpoint analysis agent, which is operable to collect information on system 810 whether it is connected to network infrastructure 820, cloud computing environment 802, or off-line.

In the paradigm disclosed above, use of an endpoint analysis agent can augment traditional network flow data collected by on-premise infrastructure. While it may be preferable to have both network-derived and endpoint-derived flow data as cross-checks to each other, this is not an option in many cloud environments, particularly public clouds that are typically multi-tenant and thus cannot share network flow data among separate enterprise tenants without violating confidentiality. In such environments, cloud activity analysis agent 806 may provide the only means for collecting any form of data pertinent to network activity. Thus, endpoint data collection not only can augment traditional network flow data, but also can supplant traditional network-device gathered flow data in cloud environments where the network devices are not under enterprise control.

This use case can be generalized to any situation in which the primary reliance for network security is on endpoint-derived flow data. This may occur because of cloud deployments, virtualized server deployments (where there is not flow observation by physical network devices), or where there is a desire for a simpler or lower-cost flow collection options.

Figure 9:
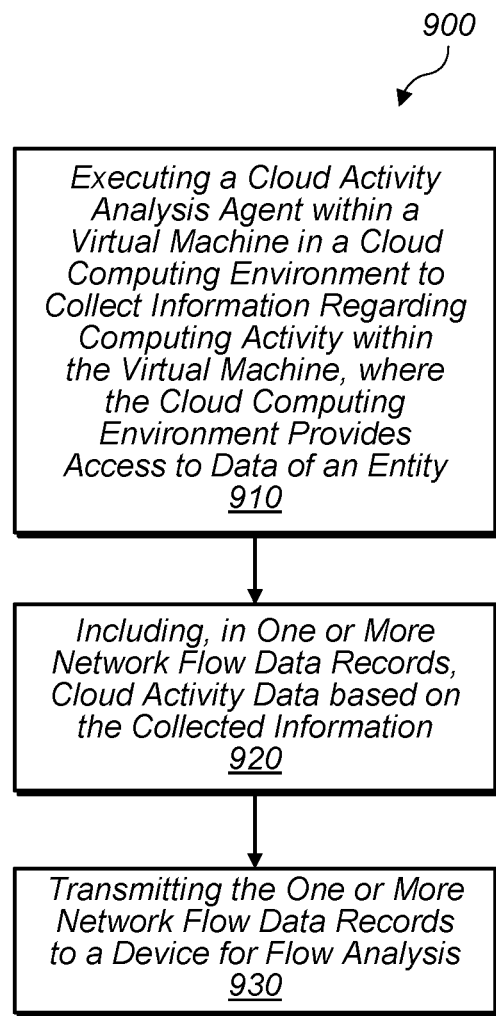
FIG. 9 is a flow diagram of an exemplary method for collecting information relating to computing activity within a cloud computing environment.

Turning now to FIG. 9, an exemplary method 900 that may be performed by cloud activity analysis agent 806 is shown. As depicted, method 900 includes steps 910, 920, and 930. Flow begins with step 910.

In step 910, a cloud activity analysis agent such as agent 806 is executed within a virtual machine in a cloud computing environment that provides access to data of an entity. The cloud activity analysis agent collects information regarding computing activity within the virtual machine. As noted, the cloud activity analysis agent may collect a variety of information, such as that described above relative to endpoint analysis agent 340. Certain data collectable in the endpoint scenario may not be applicable in the cloud environment. For example, the cloud virtual machine will not have human interface devices and typically no significant user activity (beyond occasional remote system administration sessions). Also, system hardware inventory and tracking numbers may not be as extensive or accessible in a cloud computing environment as opposed to a traditional enterprise environment, but there may be additional collectable information in the cloud setting, including cloud or virtualization provider, or other hosting attributes.

Flow then proceeds to step 920, in which cloud activity data based on the collected information is included in one or more network flow data records. This step may be performed by agent 806 in some embodiments, or by some associated process or dedicated hardware. As noted in the discussion above, in some instances, this information may be included in a known standard such as IPFIX, including in extensible fields of such a standard.

Flow then proceeds to step 930, in which the one or more network flow data records are transmitted to a device for flow analysis. This may be accomplished, in some cases, by using the network bandwidth of the cloud provider. Note that the transmitting of step 930 may be to another virtual machine with the cloud that performs the network flow analysis. Such analysis could be limited to flow analysis of cloud network activity only, or it could also collect flow data from within the entity and analyze it within the cloud. Flow collection and analysis within the cloud can benefit from the unlimited elasticity of cloud storage and processing resources. Thus, the "device" to which the flow data records are transmitted in step 930 may be within on-premise infrastructure of an entity, or may be hardware within the cloud that is configured to perform network flow analysis (e.g., within another virtual machine).

In this manner, a network administrator of the entity may be able to gain at least some degree of insight into potential security risks associated with the cloud computing environment.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A non-transitory, computer-readable medium having stored thereon instructions that are executable by an endpoint computer system to perform operations comprising:
    creating, by the endpoint computer system, 1) network flow data regarding network flows communicated by the endpoint computer system and 2) internal computing activity data regarding computing activity internal to the endpoint computer system, wherein the internal computing activity data includes process metadata about processes executing within the endpoint computer system and generating the network flows, and wherein creating the internal computing activity data includes requesting information from an operating system of the endpoint computer system via one or more application programming interfaces (APIs) or a kernel-mode driver;
    creating, by the endpoint computer system, one or more network flow data records including the network flow data, wherein the one or more network flow data records are formatted in accordance with Internet Protocol Flow Information Export (IPFIX);
    including, by the endpoint computer system in the one or more network flow data records, the internal computing activity data, wherein the internal computing activity data is included in an extended field of the one or more network flow data records, wherein the extended field is defined by IPFIX; and
    transmitting, from the endpoint computer system, the one or more network flow data records within a network including a network flow analyzer; and
    wherein the network flow analyzer is configured to receive the internal computing activity data and the network flow data and to perform analysis of the network to improve network security, wherein the analysis is based on the network flow data and the internal computing activity data.

2. The computer-readable medium of claim 1, wherein the information requested from the operating system includes one or more of the following types of information:
    system compliance information, system and application patch levels, data encryption status, presence of indicators of compromise, user activity information, user identity information, user login information, process creation information, process termination information, information regarding foreground processes, process metadata, process hierarchy information, process network activity, process storage activity, process registry activity, process resource consumption information, endpoint computer system event information, and endpoint computer system fault information.

3. The computer-readable medium of claim 1, wherein the operations further comprise:
    caching, by the endpoint computer system, the created data, wherein the caching includes storing full data detail for a configurable period of time; and receiving, from the network flow analyzer, a request to receive additional flow data from the endpoint computer system, wherein the request is made subsequent to compressed flow data being provided to the network flow analyzer by the endpoint computer system and is made during the configurable period of time.

4. The computer-readable medium of claim 1, wherein the created data includes, for a communicating process, an indication whether the communicating process was user-initiated or associated with background activity.

5. The computer-readable medium of claim 1, wherein the created data includes information about a process from which network traffic originated and information about whether the network traffic is attributable to an account.

6. The computer-readable medium of claim 1, wherein the operations further comprise:

performing, at the endpoint computer system, a local analysis of the created data.

7. A non-transitory, computer-readable medium having stored thereon instructions executable by a network flow analyzer to perform operations comprising:

receiving network flow data regarding one or more network flows being communicated by an endpoint computer system over a network;

receiving one or more network flow data records from the endpoint computer system, wherein the one or more network flow data records are formatted in accordance with Internet Protocol Flow Information Export (IPFIX), wherein the one or more network flow data records include, in an extended field defined by IPFIX, internal computing activity data relating to computing activity internal to the endpoint computer system, wherein the internal computing activity data includes one or more cryptographic hash values of processes generating network flows, and wherein the internal computing activity data includes information requested from an operating system of the endpoint computer system via one or more application programming interfaces (APIs); and using the network flow data and the internal computing activity data to perform an analysis of the network to improve network security, wherein the analysis includes matching internal computing activity data with network flow data regarding the one or more network flows.

8. The computer-readable medium of claim 7, wherein the included internal computing activity data indicates what actions were taken during a time period that includes a particular network activity by the endpoint computer system that is associated with a particular network flow identified based on the received network flow data.

9. The computer-readable medium of claim 8, wherein the actions include a list of binaries executed before and after the particular network activity.

10. The computer-readable medium of claim 7, wherein the included internal computing activity data indicates an originating process context and associated account attribution information for a network activity relating to particular network flow identified based on the received network flow data.

11. The computer-readable medium of claim 7, wherein the included internal computing activity data indicates whether a process associated with a particular network flow identified based on the received network flow data is executing on the endpoint computer system as a foreground or background process.

12. The computer-readable medium of claim 7, wherein the internal computing activity data includes compressed data from the endpoint computer system.

13. A method, comprising:

collecting, at an endpoint computer system configured to couple to a network, internal computing activity information regarding computing activity internal to the endpoint computer system, wherein the information includes file path information for processes executing within the endpoint computer system and generating network flows, and wherein the collecting includes requesting information from an operating system of the endpoint computer system via one or more application programming interfaces (APIs);

creating, by the endpoint computer system, one or more network flow data records including network flow data regarding the network flows, wherein the one or more network flow data records are formatted in accordance with Internet Protocol Flow Information Export (IPFIX);

including, by the endpoint computer system and in an IPFIX-defined extended field of the one or more network flow data records, the collected internal computing activity information; and transmitting, by the endpoint computer system, the one or more network flow data records within the network to a network flow analyzer configured to receive the internal computing activity information and further configured to receive network flow data from one or more flow collectors within the network, and wherein the network flow analyzer is further configured to perform an analysis of the network to improve network security, wherein the analysis based on the network flow data received from the one or more flow collectors and further based on the internal computing activity information included in the one or more network flow data records transmitted by the endpoint computer system.

14. The method of claim 13, further comprising:
caching, by the endpoint computer system, the collected internal computing activity information.

15. The method of claim 14, wherein the caching is performed to hold data during time periods when a network connection to report the collected internal computing activity information is not available.

16. The method of claim 14, further comprising:
performing, by the endpoint computer system, data reduction operations on the collected internal computing activity information such that an amount of data transmitted to the network flow analyzer is reduced.

* * * * *